(12) United States Patent
Chen et al.

(10) Patent No.: US 8,666,177 B2
(45) Date of Patent: Mar. 4, 2014

(54) TEXTURE-PATTERN-ADAPTIVE PARTITIONED BLOCK TRANSFORM

(75) Inventors: Zhi Bo Chen, Beijing (CN); Xiao Zhong Xu, Fuzhou (CN); Qu Qing Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 52 days.

(21) Appl. No.: 13/511,547

(22) PCT Filed: Dec. 4, 2009

(86) PCT No.: PCT/CN2009/001369
§ 371 (c)(1),
(2), (4) Date: May 23, 2012

(87) PCT Pub. No.: WO2011/066672
PCT Pub. Date: Jun. 9, 2011

(65) Prior Publication Data
US 2012/0288210 A1    Nov. 15, 2012

(51) Int. Cl.
*G06K 9/36* (2006.01)
*G06K 9/46* (2006.01)

(52) U.S. Cl.
USPC .......................................... 382/232; 382/239

(58) Field of Classification Search
USPC .................... 382/232–234, 239, 243, 248
See application file for complete search history.

(56) References Cited

U.S. PATENT DOCUMENTS

| | | |
|---|---|---|
| 5,845,013 A | 12/1998 | Bouchard et al. |
| 2008/0144951 A1 | 6/2008 | Zhang |

FOREIGN PATENT DOCUMENTS

| | | |
|---|---|---|
| CN | 1173958 | 2/1998 |
| CN | 101325707 | 12/2008 |
| EP | 0914004 | 5/1999 |

OTHER PUBLICATIONS

W Ding, F Wu, X Wu, S Li, H Li, "Adaptive directional lifting-based wavelet transform for image coding", IEEE Transactions on Image Processing, 2007, vol. 16, Issue: 2.*
CL Chang, B Girod, "Direction-adaptive discrete wavelet transform for image compression", IEEE Transactions on Image Processing, 2007, vol. 16 , Issue: 5.*
Y Ye, M Karczewicz, "Improved H. 264 intra coding based on bi-directional intra prediction, directional transform, and adaptive coefficient scanning", IEEE International Conference on Image Processing, ICIP 2008.*

* cited by examiner

*Primary Examiner* — Li Liu
(74) *Attorney, Agent, or Firm* — Robert D. Shedd; Richard LaPeruta (57) ABSTRACT

The invention is related to encoding an image block of an image using a partitioned block transform. The inventors recognized that applying a texture-pattern associated invertible mapping to the pixels of a first partition, said first partition resulting from partitioning said image block according to a current texture pattern with which said texture-pattern associated invertible mapping is associated, allows for limiting the maximum number of required first 1-D transforms to not exceeding a number of columns in the image block as well as limiting the maximum number of required second 1-D transforms to not exceeding a number of rows in the image block, also. Achieving limitation of maximum required 1-D transforms enables more efficient implementation on hardware and improves encoding performance but also allows for further partitions according to texture patterns which comprise at least one of multiple strips, texture patterns with highly unsymmetrical pixel distribution and non-directional texture patterns.

9 Claims, 10 Drawing Sheets

| 1 | 1 | 0 | 0 |
|---|---|---|---|
| 1 | 1 | 0 | 0 |
| 1 | 1 | 0 | 0 |
| 1 | 1 | 0 | 0 |

| Before 1st transform | | | | After 1st transform | | | | Before 2nd transform | | | | After 2nd transform | | | |
|---|---|---|---|---|---|---|---|---|---|---|---|---|---|---|---|
| a1 | b1 | c1 | | a1' | b1' | c1' | | a1' | b1' | c1' | | A1 | B1 | C1 | |
| a2 | b2 | c2 | | a2' | b2' | c2' | | a2' | b2' | c2' | | A2 | B2 | C2 | |
| a3 | | c3 | | a3' | | c3' | | a3' | | | | A3 | C2 | | |
| | | c4 | | | | c4' | | c4' | | | | C4 | | | |

TEXTURE-PATTERN-ADAPTIVE PARTITIONED BLOCK TRANSFORM

This application claims the benefit, under 35 U.S.C. §365 of International Application PCT/CN2009/001369, filed Dec. 4, 2009, which was published in accordance with PCT Article 21(2) on Jun. 9, 2011 in English.

TECHNICAL FIELD

The invention is made in the technical field of encoding images. More precisely, the invention is related to encoding an image block of an image using a partitioned block transform.

BACKGROUND OF THE INVENTION

For encoding an image, it is well known in the art to transform image blocks of the image using discrete cosine transforms (DCT) or discrete wavelet transform (DWT).

For instance, DCT is commonly used in hybrid video coding framework to exploit redundancy in spatial domain and exhibit excellent energy compaction for highly correlated signals, as well as the properties of being separable, symmetric and orthogonal.

Current image/video coding standards usually use 2 Dimensional separable DCT or DWT for coding, whose basis functions can be generated by multiplying the horizontally oriented 1-D basis functions with vertically oriented set of the same functions.

For instance, for an exemplary N×N block firstly N N-point 1-D DCT operations (first 1-D transform) are performed vertically over the original pixels, to generate N×N intermediate coefficients; secondly N N-point 1-D DCT operations (second 1-D transform) are performed horizontally over the intermediate coefficients, to generate yet further transformed coefficients. This kind of scheme tends to do well for image texture details oriented strictly horizontally and vertically, while ringing artifacts tend to appear around other edge orientations, which significantly deteriorates the visual quality.

This problem is identified and addressed by C. L. Chang and B. Girod in "Directional-Adaptive Partitioned Block Transform for Image Coding", ICIP 2008. Within this paper, the authors propose direction-adaptive partitioned block transform (DA-PBT) according to which the image block is divided into directional partitions with the partition boundaries aligned with direction of the first 1-D transform and with the length of the second 1-D transforms being limited such that they do not extend across partition boundaries. This ensures that the maximum required length of 1-D transforms equals N.

SUMMARY OF THE INVENTION

Although limiting the maximum required length of 1-D transforms, DA-PBT as proposed by C. L. Chang and B. Girod may require either more than N first 1-D transforms or more than N second 1-D transforms. Further, for application of DA-PBT a direction need to be present in the image block.

The inventors of the current invention recognized that accumulating pixels of a first partition of at least a portion of the image block by applying a texture-pattern associated invertible mapping to the pixels of said first partition, said first partition resulting from partitioning said image block according to a current texture pattern with which said texture-pattern associated invertible mapping is associated, allows for limiting the maximum number of required first 1-D transforms to N as well as limiting the maximum number of required second 1-D transforms to N, also.

The accumulation of pixels not only achieves this limitation of maximum required 1-D transforms which enables more efficient implementation on hardware as well as improved encoding performance but also allows for further partitions according to texture patterns which comprise at least one of multiple strips, texture patterns with highly unsymmetrical pixel distribution and non-directional texture patterns.

Therefore, a method and a device for encoding an image block of an image is proposed wherein the method comprises the step of accumulating pixels of a first partition of at least a portion of the image block by applying a texture-pattern associated invertible mapping to the pixels of said first partition, said first partition resulting from partitioning said image block according to a current texture pattern with which said texture-pattern associated invertible mapping is associated and entropy encoding data which allows for reconstruction or retrieval of the current texture-pattern. The proposed device comprises means adapted for performing said step of pixel accumulation and means adapted for entropy encoding data which allows for reconstruction or retrieval of the current texture-pattern.

In an embodiment wherein the image block comprises N times M pixels with N being equal to or larger than M, the proposed encoding method comprises the steps of partitioning the at least a portion of the image block according to a current texture-pattern-adaptive partition associated with a current texture-pattern into a first sub-set of pixels and at least a second sub-set of pixels, using a texture-pattern associated scan order for arranging the pixels of the first sub-set in a meta-sequence of pixel sequences, said texture-pattern associated scan order being associated with the current texture-pattern and each of the pixel sequences comprising at most N pixels, generating a further meta-sequence of at most M further pixel sequences wherein each of the further pixel sequences comprises either one of the pixel sequences or a concatenation of pixel sequences of a sub-sequence of the meta-sequence with each of the further pixel sequences comprising at most N pixels, generating coefficient sequences by transforming the further pixel sequences, generating further coefficient sequences by one-dimensional transformations across the coefficient sequences, generating a yet further coefficient sequence by quantizing and scanning the coefficients comprised in the further coefficient sequences wherein scanning is done according to an encoding scan order, entropy encoding the yet further coefficient sequence and entropy encoding an indication associated with the current texture-pattern said indication being a reference which allows for retrieval or reconstruction of the current texture pattern.

In said exemplary embodiment, the method is adapted such that the current texture-pattern-adaptive partition may be associated with a texture-pattern comprising multiple strips, an unsymmetrical texture-pattern or a non-directional textured pattern.

The pixels of the at least a second sub-set may be treated the similar to those of the first subset, but encoding scan order may be different. Further coefficient prediction between the first sub-set and the at least a second sub-set may be applied.

The at least a portion in which said partitioning takes place may result from edge detection, segmentation or intensity distribution classification.

The invention further proposes a method for decoding an encoded image block of an image, wherein said image block comprises N times M pixels with N being equal to or larger than M, said method comprises decoding a first subset of at least a portion of the image block by performing the steps of (a) entropy decoding an encoded sequence of first coefficients, (b) entropy decoding an encoded indication associated with a current texture-pattern and using the indication for generating the current texture pattern either by retrieval from a memory or by reconstruction based on the indication, (c) using a decoding scan order for arranging the first coefficients in a meta-sequence of at most M coefficient sequences, each of the at most M coefficient sequences comprising at most N first coefficients, (d) dequantizing the first coefficients before, while or after arranging the first coefficients in step (c), (e) generating at most M further coefficient sequences by one-dimensional transformations across the at most M dequantized coefficient sequences, (f) generating at most M first pixel sequences by transforming the at most M further coefficient sequences, and (g) using a distribution pattern associated with the current texture pattern for distributing the generated pixels over the image block.

In an embodiment, said decoding method further comprises decoding a second subset of said at least a portion of the encoded image block by generating at most M second pixel sequences through application of steps (a), (b), (c), (d), (e) and (f) to a sequence of second coefficients and using the distribution pattern for filing a remainder of said at least a portion of the image block with pixels of said at most M generated second pixels sequences, said remainder being an empty remaining part of said at least a portion of the image block after generation of said first subset.

And a corresponding device for decoding a first subset of at least a portion of an encoded image block of an image is proposed wherein said at least a portion is encoded using a texture-pattern-adaptive partitioned block transform and said image block comprises N times M pixels with N being equal to or larger than M. Said device for decoding comprising decoding means for entropy decoding an encoded sequence of first coefficients, said decoding means being adapted for entropy decoding an encoded indication associated with a current texture-pattern and using the indication for generating the current texture pattern either by retrieval from a memory or by reconstruction based on the indication, first arranging means adapted for using an decoding scan order for arranging the first coefficients in a meta-sequence of at most M coefficient sequences, each of the at most M coefficient sequences comprising at most N first coefficients, dequantizing means for dequantizing the first coefficients, means for generating at most M further coefficient sequences by one-dimensional transformations across the at most M dequantized coefficient sequences, means for generating at most M first pixel sequences by transforming the at most M further coefficient sequences, second arrangement means adapted for using a distribution pattern associated with the current texture pattern for generating a subset of pixels comprised in said at least a portion of the image block by distributing the pixels of the generated first pixel sequences over the image block.

The invention yet further proposes a physical storage medium like an optical disk, a solid state memory or a hard disk wherein the physical storage medium carries a bit-stream which comprises a sequence of encoded coefficients and encoded mask information, pixel sequences can be generated from said encoded coefficients by decoding and inverse transformation and wherein said mask information allows for reconstructing a mask used for selecting pixels of an image block and for determining a distribution pattern associated with the mask, said distribution pattern allowing for distributing the pixels of a pixel sequences over the image block.

The features of further advantageous embodiments are specified in dependent claims.

BRIEF DESCRIPTION OF THE DRAWINGS

Exemplary embodiments of the invention are illustrated in the drawings and are explained in more detail in the following description. The exemplary embodiments are explained only for elucidating the invention, but not limiting the invention's disclosure, scope or spirit defined in the claims.

In the figures.

EXEMPLARY EMBODIMENTS OF THE INVENTION

The invention may be realized on any electronic device comprising a processing device correspondingly adapted. For instance, the invention may be realized in a television, a mobile phone, a personal computer, a digital still camera, or a digital video camera.

There is an exemplary embodiment of the method for encoding an image block of an image in which said image block comprises a number of rows and a number of columns and said method comprises the step of encoding a first subset of pixels resulting from partitioning at least a portion of the image block according to a current texture-pattern-adaptive partition associated with a current texture-pattern into said first sub-set of pixels and at least a second sub-set of pixels. In said exemplary embodiment the step of encoding the first subset comprises using a first and a second texture-pattern associated invertible mapping for generating a meta-sequence of pixel sequences wherein, either, the number of pixel sequences in the meta-sequence does not exceed said number of rows and, in each of the pixel sequences, the number of pixels does not exceed said number of columns, or the number of pixel sequences in the meta-sequence does not exceed said number of columns and, in each of the pixel sequences, the number of pixels does not exceed said number of rows, and applying a first and a second one-dimensional transformation to the generated pixel sequences for generating a sequence of coefficients, quantizing and scanning the coefficients comprised in the sequences of coefficients wherein scanning is done according to an encoding scan order, entropy encoding the quantized and scanned coefficients and entropy encoding data which allows for reconstruction or retrieval of the current texture-pattern wherein said first and a second texture-pattern associated invertible mapping are associated with the current texture pattern.

Figure 1:
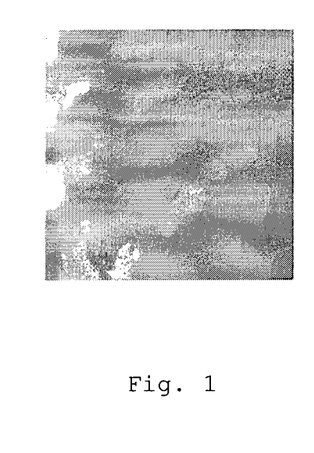
FIG. 1 depicts an exemplary image block showing a texture-pattern.

In more detail, an exemplary rectangular block in a picture may contain several video objects or some textures. This phenomenon, especially when occurs with multiple strips or edges along directions other than vertical/horizontal, can cause lots of non-zero coefficients after traditional DCT transform. The coding efficiency therefore is low. A typical example of directional texture with multiple strips is shown in FIG. 1.

Given a partition rule, each pixel in the exemplary image block is assigned to one of two or more sub-groups. In the following, the number of sub-groups is exemplarily set to be two. But, one skilled in the art will immediately understand how to expand the principles of partition and accumulation if partition allows for more than two sub-groups.

Figure 2:
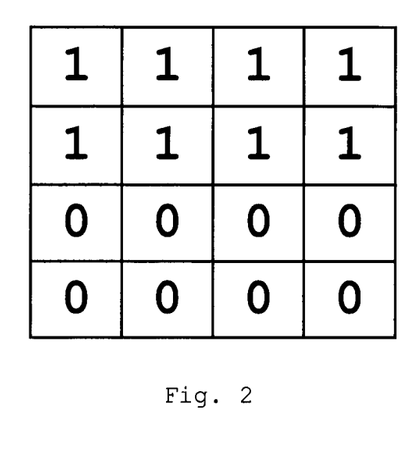
FIG. 2 depicts an exemplary binary partition mask.

The partition procedure may be realized by one or more binary masks with the same size as the block. For example, the mask in FIG. 2 means the pixels in upper half part of the block belong to one partition while pixels in the lower half belong to another. Then a partition rule allowing for n sub-groups therefore has a one-to-one mapping relationship with an n-ary mask. Thus, the exemplary binary partition rule discussed below has one-to-one mapping relationship with a binary mask. For n larger than two, the n-ary mask may be represented by set of binary masks.

The number of pixels in each of the partitions (sub-block) may not be equal. That means unsymmetrical partitioning is allowed. By doing so, the pattern boundaries within the block can be detected more accurate so as to improve the energy concentration within each partition (sub-block).

In one exemplary embodiment, the masks are predefined at encoder as well as at decoder side. For instance, the exemplary binary masks comprised in tables at the end of the description express considerations of horizontal, vertical, diagonal and other pattern orientations, with one or more strips and may be referenced in the encoded data resulting from encoding by an encoded masks number, for instance.

In addition, new masks may be derived by analyzing the patterns in the block. Possible methods include but are not limited to edge detection, statistics analysis, transform domain analysis, etc. Then, a new mask derived like that is encoded when being used the first time and may referred to afterwards by a new reference sign or number assigned to the new mask.

The mask information, either by indexing from a list of pre-defined patterns, or acquired from local analysis of image properties, should be stored and transmitted to decoder for correct decoding. For the former approach, only index of the masks need to be sent; for the later the forms of adopted masks themselves should also be transmitted at least if being used the first time. These two approaches are briefly explained in FIG. 8.

Figure 3A:
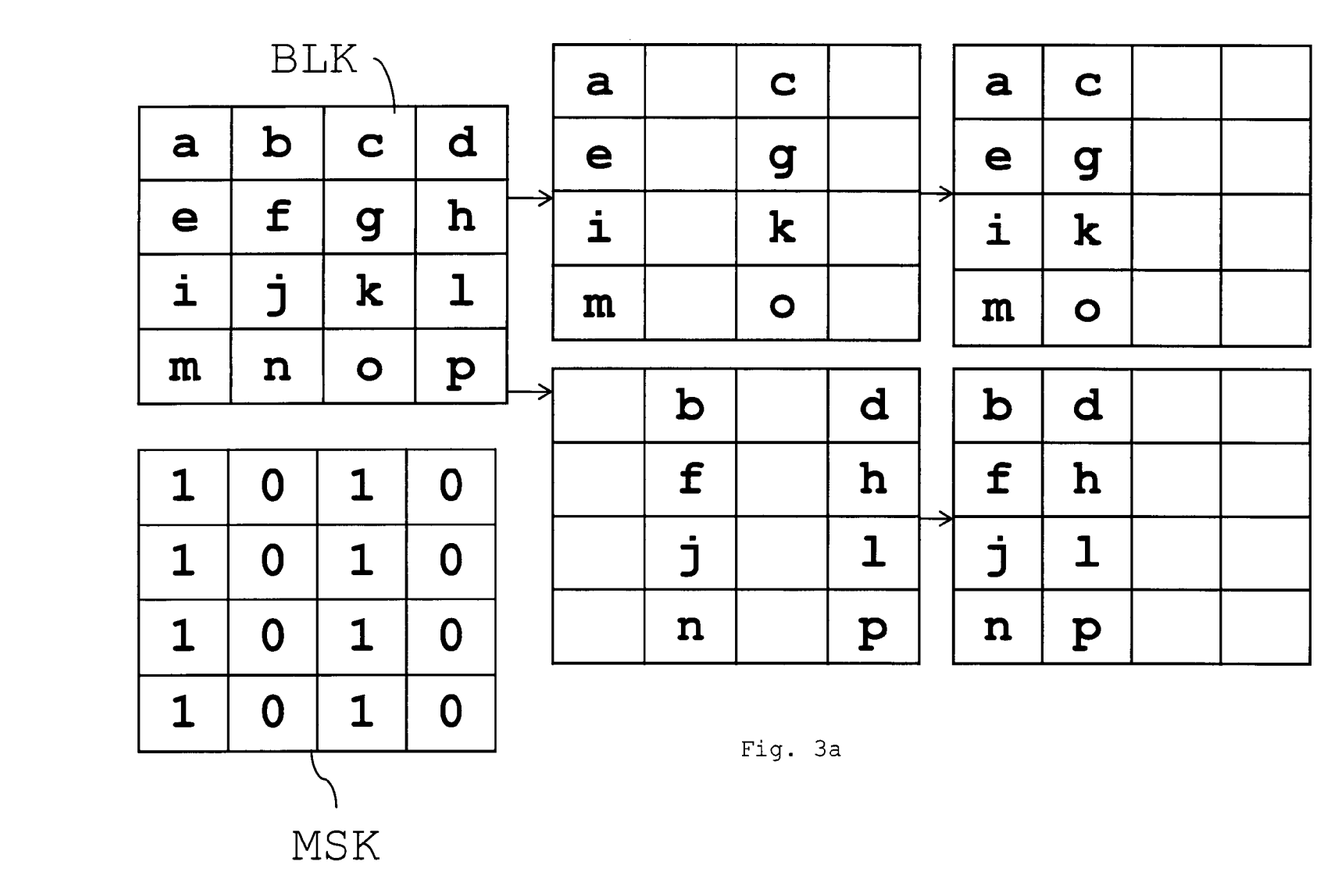
FIG. 3a depicts a first example of partitioning of a block into sub-blocks and modification of the sub-blocks by accumulating pixels of the sub-blocks.
Figure 3B:
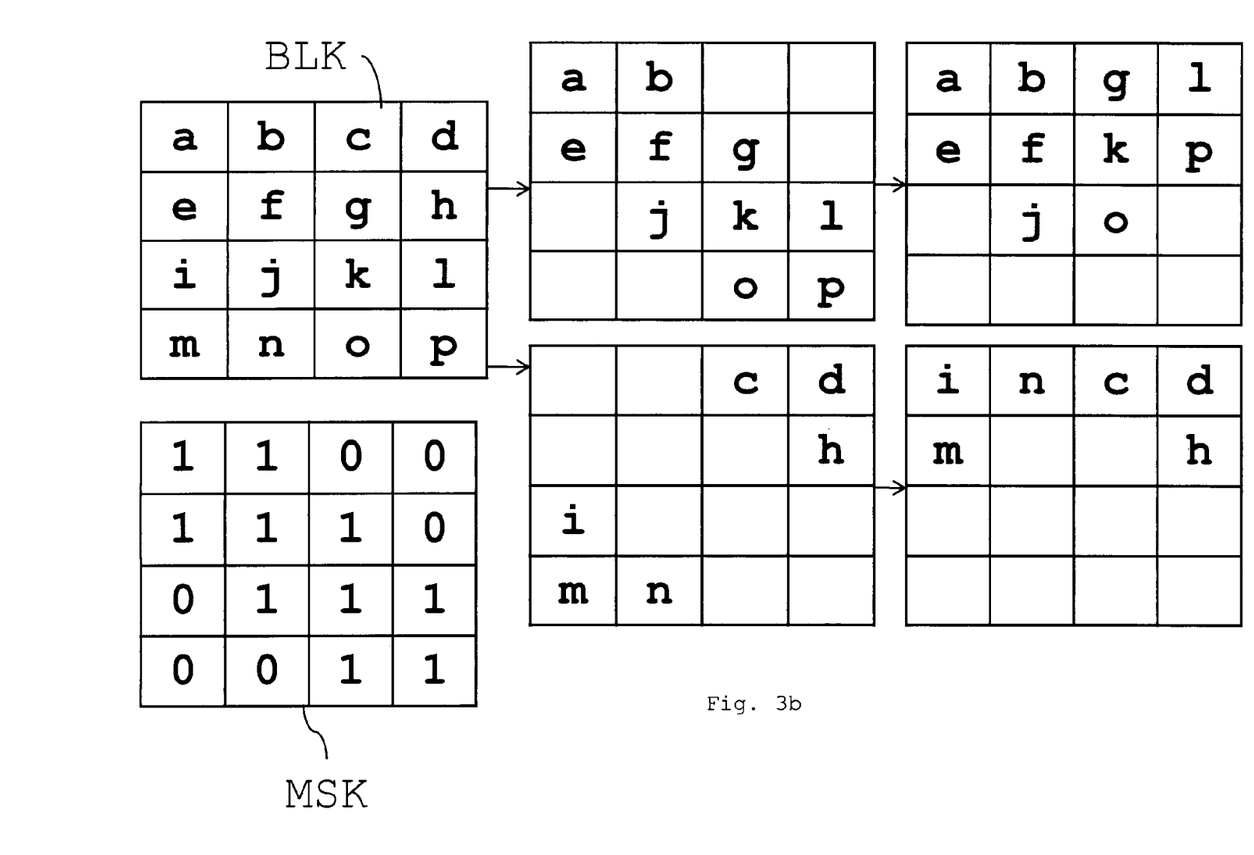
FIG. 3b depicts a different second example of partitioning of a block into sub-blocks and modification of the sub-blocks by accumulating pixels of the sub-blocks.

After partitioning, pixels in each of the sub-groups are shifted such that they become accumulated so that subsequent transformation benefits in that the number of non-zero coefficients is reduced. The shifting is achieved by an invertible mapping which may be specific for the partition rule applied or which may be a default invertible mapping independent from the partition rule applied, e.g. the pixels in each of the sub-partition (sub group) are shifted towards upper bound of the block (empty columns will be skipped). By doing this, the patterns within the block are removed to some extent and pixels with similar intensities are merged together. This is good for energy concentration. Examples of block merging are shown in FIGS. 3a and 3b.

The partitioning-and-merging operation exemplarily described here is a more generic framework, which actually generates two or more adjuvant blocks from one single block, with a more homogeneous pixel intensity distribution inside each of the adjuvant blocks.

In the following, an example of a partition-rule-specific invertible mapping is described. This example comprises two steps and is applicable to all partitions or masks which are related to texture-patterns showing a certain orientation or direction (vertical, horizontal, diagonal, curved, etc).

Figure 4A:
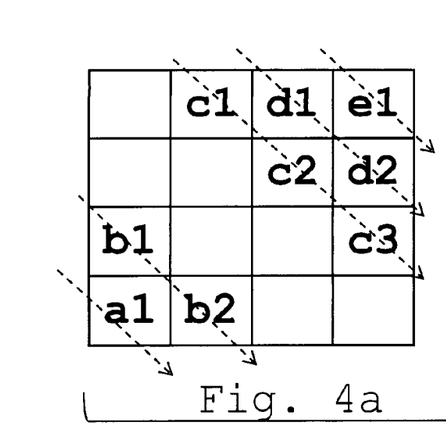
FIG. 4a-4c depicts a first example of accumulation of pixels of a sub-set of a block using an invertible two-step texture-pattern-dependent mapping.
Figure 5A:
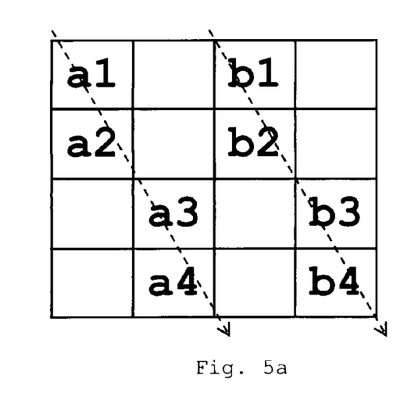
FIG. 5a-5c depicts a different second example of accumulation of pixels of a sub-set of a block using an invertible two-step texture-pattern-dependent mapping.

In a first step of the exemplary non-default invertible mapping, pixels in the sub-block are shifted along the direction indicated by the pattern orientation of the mask. Examples of this step are provided in FIG. 4a and FIG. 5a.

The direction of the mask may be vertical, horizontal, diagonal or others.

Figure 4B:
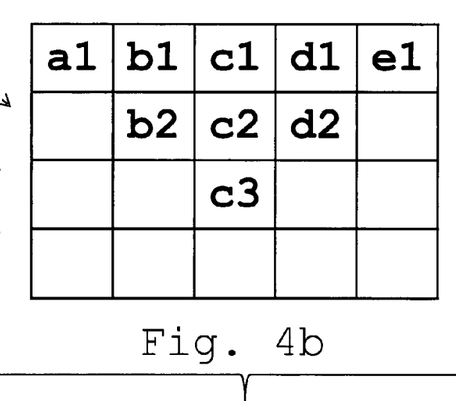
Figure 5B:
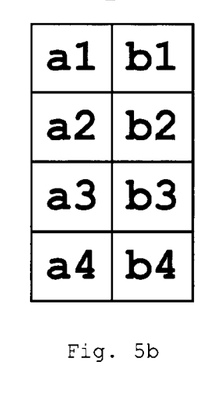
Figure 6:
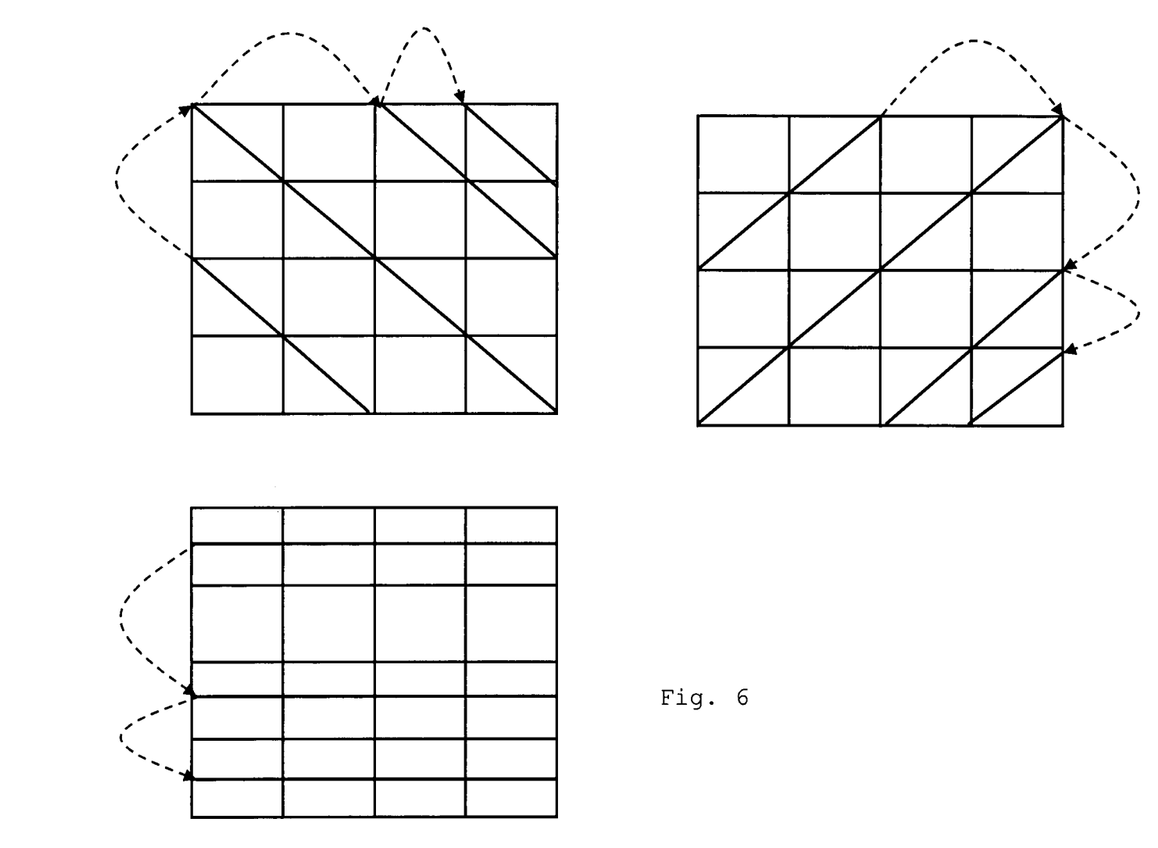
FIG. 6 depicts exemplary embodiments of a texture-pattern associated scan principle.

After said first Step, a series of pattern strips (may be different in length) are acquired, organized in an intermediate array, as is shown in FIG. 4b and FIG. 5b. The order of those strips (from left to right) in the columns of the intermediate array is determined by a fix pattern scan principle (e.g. from the most left strip of the pattern, which is indicated by a smallest x coordinate on average, to the most right one; in addition, from the most top strip of the pattern, which is indicated by a smallest y coordinate on average, to the most bottom one;) for a given mask. Examples of the scan principle are shown in FIG. 6.

This first step of the exemplary non-default invertible mapping results in a series of intermediate pixel sequences (also called intermediate array of strips) wherein each of the intermediate pixel sequences or strips comprises at most N pixels—if the image block comprises N*N pixels—but the number of intermediate pixel sequences (strips) comprised in the series (intermediate array) is not necessarily limited to be at most N.

Therefore, the exemplary non-default invertible mapping comprises a second step after which it is ensure that the number of pixel sequences in a further series resulting from said second step is not larger than N.

Within the second step, sub-series of intermediate pixel sequences comprised in the series are merged together by concatenation of the intermediate pixel sequences comprised in the sub-series. The concatenation is done under the constraint that each pixel sequence resulting from concatenation still does not comprise more than N pixels.

Figure 4C:
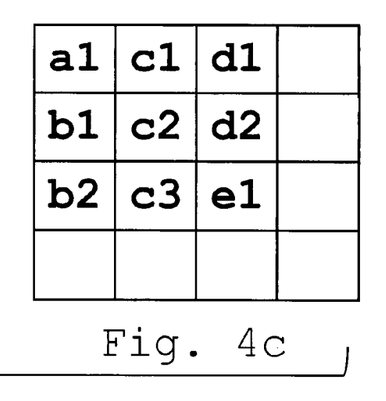
Figure 5C:
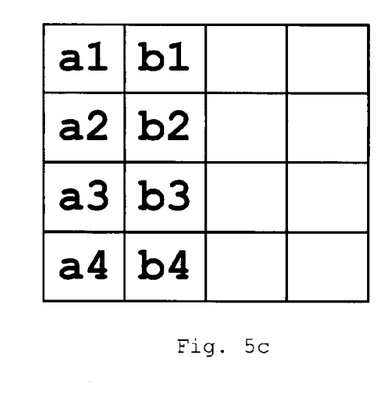

With other words, in the second step each of the strips in the intermediate array is inserted into one column sequentially, from one side of the intermediate array to another. If adding the next strip to the end of the sequence of a current column will cause the length of this sequence to become larger than N, this strip will be used to initiate a new column. Then, subsequent strips are added to the end of this new column sequentially again until adding another subsequent strip would cause the number of pixels comprised in this new column to be larger than N. This operation lasts until all the strips in the intermediate array are filled in. The output of this operation is a 2-D block with column length no larger than N. Examples of the result of the second step are shown in FIG. 4c and FIG. 5c.

For partition rules which ensure that all the sub-blocks resulting from partitioning comprise at least N*N/4 pixels, it can be assured that the second step results in a further series which comprises at most N pixel sequences each of said N pixel sequences comprising at most N re-arranged pixels.

If there is no clear direction in the mask, the default shifting operation (shifting towards upper bound) is performed.

Figure 7:
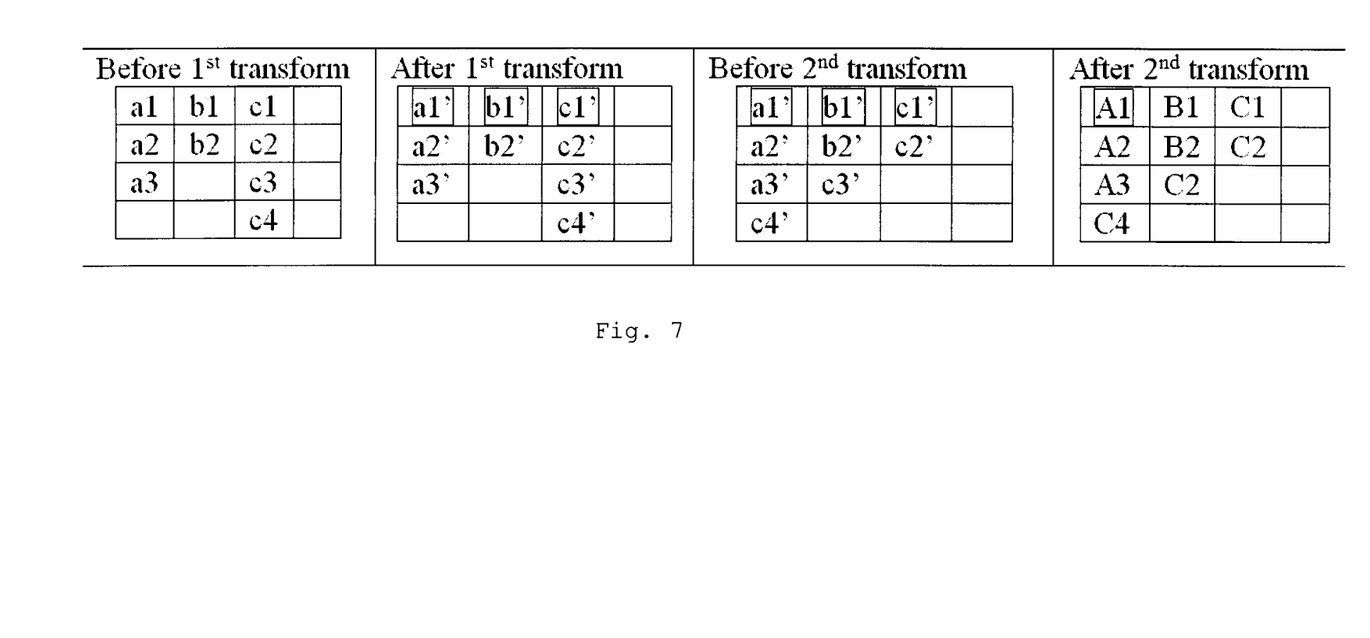
FIG. 7 depicts an example of transform procedure, wherein the DC coefficient(s) after 1st and 2nd transform are indicated by squares.

After block assembling operation, a 2-D transform, for example a 2-D DCT transform, is applied to the assembled sub-blocks separately. The first 1-D transform of 2-D transform is performed vertically which corresponds to the first 1-D transform being performed along the pattern direction because the shifting operation of the first step of pixel assembling is done according to the pattern direction. After the first 1-D transform; the resulting intermediate coefficients are shifted towards the left side of the block, then the second 1-D transform is performed horizontally. An example of transform procedure is shown in FIG. 7, where the DC coefficient(s) after 1st and 2nd transform are indicated by the squares, separately.

To further explore the correlation between these two sub-blocks after 2-stage transform, DC (AC) coefficients prediction between the sub-blocks may also be used, i.e., coefficients values of a first partition may be used as prediction for those in similar positions in a second partition, with the residue of the second partition with respect to the prediction of the first partition being further processed, e.g. quantized, zig-zag scanned and entropy encoded.

Figure 9:
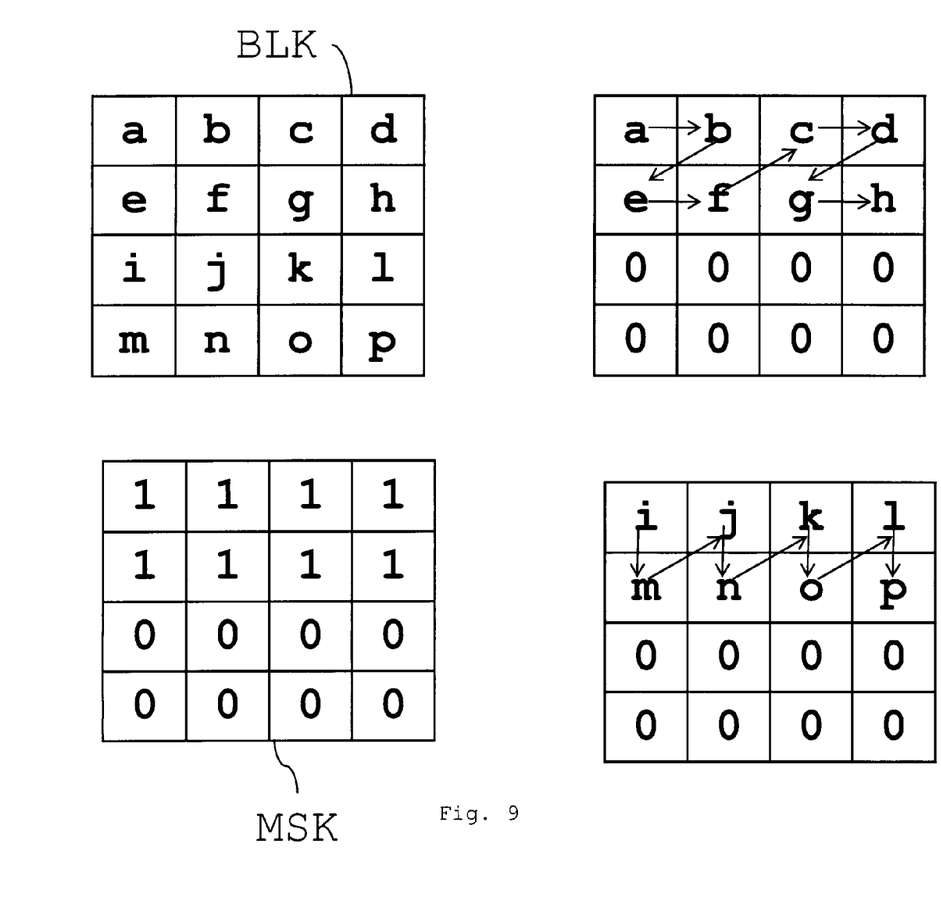
FIG. 9 depicts exemplary encoding scan orders which differ for two exemplary partitions into which an exemplary image block is divided using an exemplary binary mask.

Zig-zag scans and entropy coding are processed in the sub-blocks—or the residues—separately. For example if the mask in FIG. 9 is used, the scan orders for transformed coefficients in partition one and two can be differently designed as shown in FIG. 9. Entropy coding methods over these two partitions include but not limited to any entropy coding schemes, e.g. Huffman coding, CAVLC, CABAC, etc. and result in an output bit stream which is recorded on an physical storage medium, e.g. optical disks like DVD or BD, solid state storage media like flash or hard disk drives, wireless or wire-bound transmitted or broadcasted. The output bit stream includes code of data which either references a predefined partition rule or data allowing for reconstruction of the partition mask and the corresponding inverse of the invertible mapping used for accumulation in the assembling step.

Figure 11:
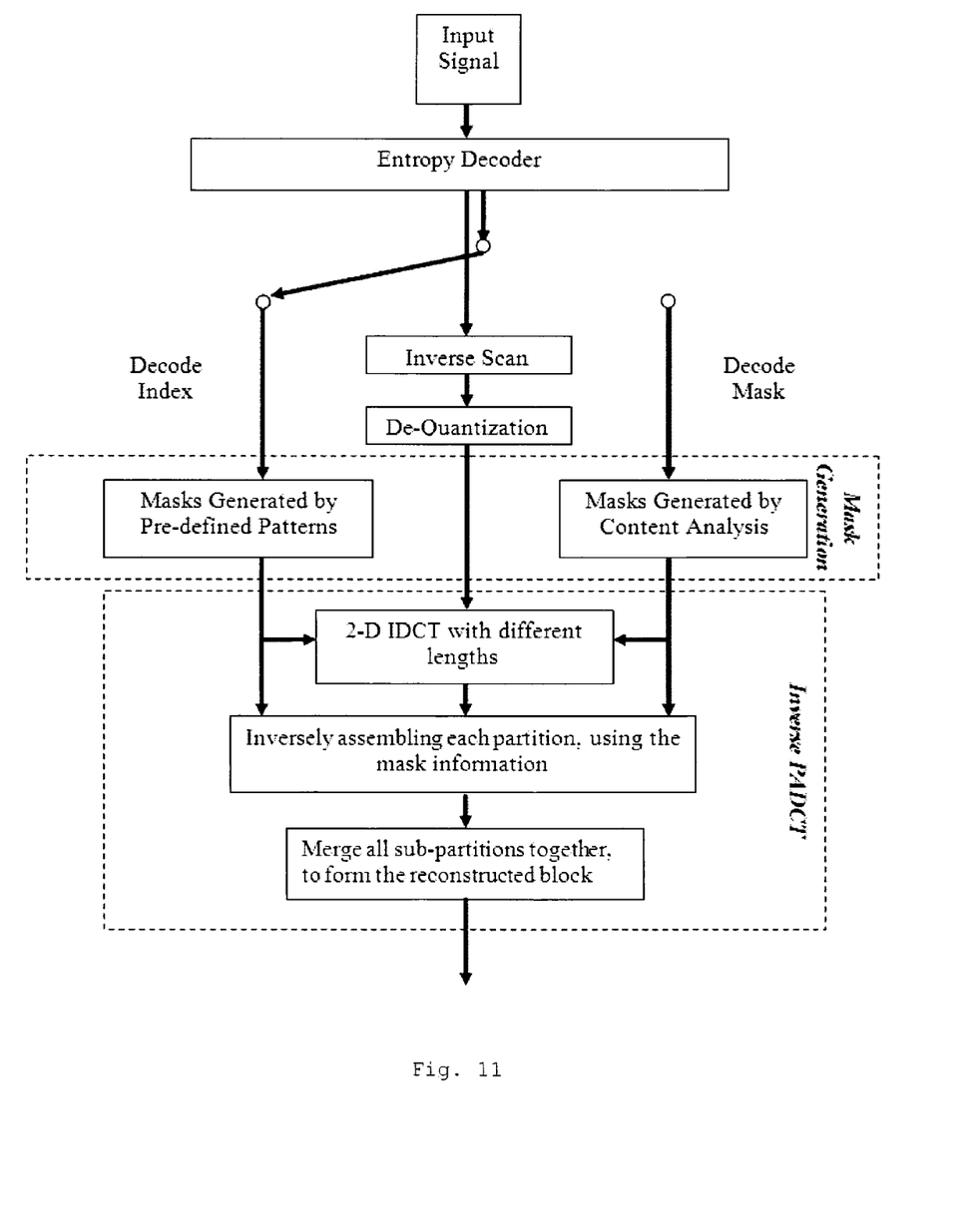
FIG. 11 depicts an exemplary flowchart of corresponding image block decoding at decoder side.

The flowchart of assembling operation and transform and their inverse operations is shown in FIG. 11. The decoding process will be described in the next section.

Input to this step is the compressed bitstream. Output from this step includes the scanned and quantized coefficients, the mask index (if using pre-defined patterns)/the mask (if using local analysis), and other side information.

For decoding, a decoding device receives an input bit-stream either by reading it from the optical storage medium or by receiving it wireless or wire-bound. From the received input bit stream code of data allowing for reconstruction or retrieval of the partition mask and the corresponding inverse of the invertible mapping is separated and decoded. The remainder of the received bit stream is reverse scanned and de-quantized to achieve accumulated coefficient sub-blocks ready for inverse transform. Inverse 1-D transform is applied horizontally and the resulting intermediate coefficients may then be shifted to the right wherein which of the immediate coefficients is shifted and how far it is shifted is determined using the partition mask information.

Then the immediate coefficients are inverse 1-D transformed vertically resulting in a sub-block of pixels accumulated in one edge of the sub-block.

Using the mask information the original position of each of the accumulated pixels can be determined. That is, the fixed pattern scan principle associated with the first step assembly can be used to re-distribute the pixels accumulated in the sub-block over the block so that afterwards the respective partition is restored. In much the same way, the other partition(s) can be restored and all partitions can be combined for re-gaining the entire image block.

Figure 8:
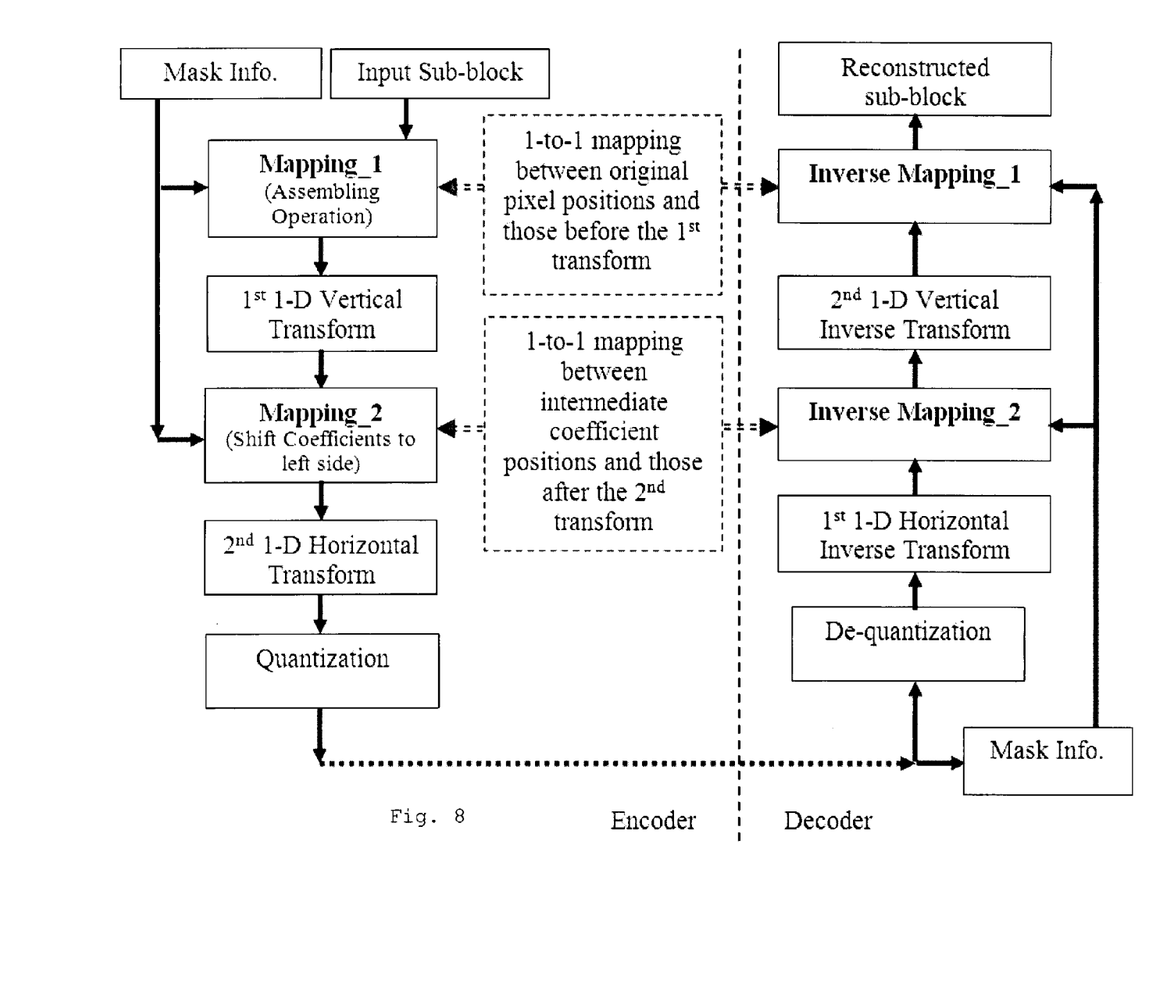
FIG. 8 depicts an example of flow of information in encoding and decoding process with indication of correspond mappings in the two processes.

According to the mask information, a one-to-one mapping from the original pixels and those for 1st transform can be established (referred as Mapping 1). The intermediate coefficients after 1st transform are shifted to the left side for the 2nd transform. Then another one-to-one mapping from the intermediate coefficients after 1st transform to those for the 2nd transform can be established (referred as Mapping_2). These two mapping relations can be acquired once the decoder knows the mask information. Because the two mapping operations are invertible, the decoder can implement the inverse mapping process to establish the position relation between a reconstructed pixel and a transformed coefficient. The flowchart of inverse mapping operation at the decoder is shown in FIG. 8.

Figure 10:
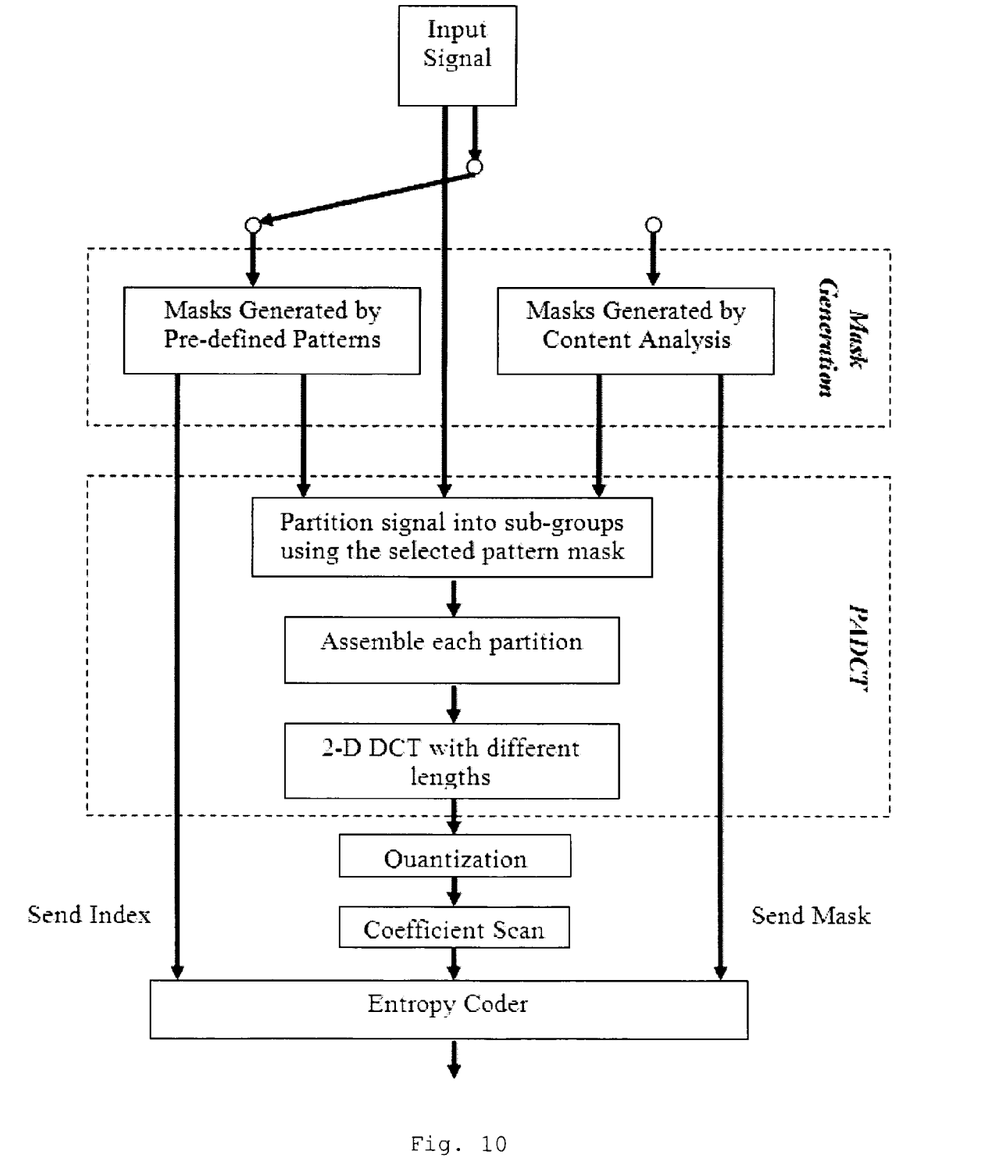
FIG. 10 depicts a diagram of encoding using exemplary texture-pattern-adaptive partitioned block transform for encoding at encoder side.

The Diagram of Texture-pattern-adaptive partitioned block transform and the encoding framework of this invention are shown in FIG. 10. In "Mask Generation" module, the mask can be generated by pre-defined patterns as Appendix described. And the mask can also be generated by local content analysis results, e.g. pixels in one block can be classified into two (or more) classes according to intensity distribution or can be classified based on edge or segmentation detection results.

APPENDIX

Vertical Masks: (V01~V10)

| | | | | | | | | | | | | | | | |
|---|---|---|---|---|---|---|---|---|---|---|---|---|---|---|---|
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 1 | 1 | 1 | 0 | 0 | 0 | 0 | 1 | 1 | 0 | 0 | 1 | 1 | 0 | 0 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 0 | 1 | 0 | 1 | 0 | 1 | 0 | 1 | 0 | 0 | 1 | 1 | 0 | 0 | 1 |
| 1 | 1 | 0 | 0 | 0 | 0 | 1 | 1 | 1 | 1 | 0 | 0 | 0 | 0 | 0 | 0 |
| 1 | 1 | 0 | 0 | 0 | 0 | 1 | 1 | 1 | 1 | 0 | 0 | 0 | 0 | 0 | 0 |

APPENDIX-continued

```
1 1 0 0 0 0 1 1 1 1 0 0 0 0 0 0
1 1 0 0 0 0 1 1 1 1 0 0 0 0 0 0
1 1 0 0 0 0 1 1 1 1 0 0 0 0 0 0
1 1 0 0 0 0 1 1 1 1 0 0 0 0 0 0
1 1 0 0 0 0 1 1 1 1 0 0 0 0 0 0
1 1 0 0 0 0 1 1 1 1 0 0 0 0 0 0
1 1 1 1 1 1 0 0 1 1 1 0 0 1 1 1
1 1 1 1 1 1 0 0 1 1 1 0 0 1 1 1
1 1 1 1 1 1 0 0 1 1 1 0 0 1 1 1
1 1 1 1 1 1 0 0 1 1 1 0 0 1 1 1
1 1 1 1 1 1 0 0 1 1 1 0 0 1 1 1
1 1 1 1 1 1 0 0 1 1 1 0 0 1 1 1
1 1 1 1 1 1 0 0 1 1 1 0 0 1 1 1
1 1 1 1 1 0 0 0 1 1 1 0 0 0 0 0
1 1 1 1 1 0 0 0 1 1 1 0 0 0 0 0
1 1 1 1 1 0 0 0 1 1 1 0 0 0 0 0
1 1 1 1 1 0 0 0 1 1 1 0 0 0 0 0
1 1 1 1 1 0 0 0 1 1 1 0 0 0 0 0
1 1 1 1 1 0 0 0 1 1 1 0 0 0 0 0
1 1 1 1 1 0 0 0 1 1 1 0 0 0 0 0
```
Horizontal Masks: (H01~H10)

```
1 1 1 1 1 1 1 1 1 1 1 1 1 1 1 1
1 1 1 1 1 1 1 1 1 1 1 1 1 1 1 1
1 1 1 1 1 1 1 1 0 0 0 0 0 0 0 0
1 1 1 1 1 1 1 1 0 0 0 0 0 0 0 0
0 0 0 0 0 0 0 0 1 1 1 1 1 1 1 1
0 0 0 0 0 0 0 0 1 1 1 1 1 1 1 1
0 0 0 0 0 0 0 0 0 0 0 0 0 0 0 0
0 0 0 0 0 0 0 0 0 0 0 0 0 0 0 0
```
Other masks in this direction can be inferred
similarly from vertical masks Diagonal-Right Masks: (DR01~DR10)

```
1 0 0 0 0 0 0 0 1 0 0 1 1 0 0 1
1 1 0 0 0 0 0 0 1 1 0 0 1 1 0 0
1 1 1 0 0 0 0 0 0 1 1 0 0 1 1 0
1 1 1 1 0 0 0 0 0 0 1 1 0 0 1 1
1 1 1 1 0 0 0 0 1 0 0 1 1 0 0 1
1 1 1 1 1 0 0 0 1 1 0 0 1 1 0 0
1 1 1 1 1 1 0 0 0 1 1 0 0 1 1 0
1 1 1 1 1 1 1 0 0 0 1 1 0 0 1 1
```
Diagonal-Left Masks: (DL01~DL10)

```
0 0 0 0 0 0 0 1 1 0 0 1 1 0 0 1
0 0 0 0 0 0 1 1 0 0 1 1 0 0 1 1
0 0 0 0 0 1 1 1 0 1 1 0 0 1 1 0
0 0 0 0 1 1 1 1 1 1 0 0 1 1 0 0
0 0 0 0 1 1 1 1 1 0 0 1 1 0 0 1
0 0 0 1 1 1 1 1 0 0 1 1 0 0 1 1
0 0 1 1 1 1 1 1 0 1 1 0 0 1 1 0
0 1 1 1 1 1 1 1 1 0 0 1 1 0 0 1
```
Vertical-Right Masks: (VR01~VR10)

```
1 1 0 0 0 0 0 1 1 0 0 1 1 0 0
1 1 1 0 0 0 0 1 1 0 0 1 1 0 0
1 1 1 0 0 0 0 0 1 1 0 0 1 1 0
1 1 1 1 0 0 0 0 0 1 1 0 0 1 1
1 1 1 1 0 0 0 0 0 1 1 0 0 1 1
1 1 1 1 1 0 0 0 1 0 0 1 1 0 0 1
1 1 1 1 1 0 0 0 1 1 0 0 1 1 0 0
1 1 1 1 1 0 0 0 1 1 0 0 1 1 0 0
```
Vertical-Left Masks: (VL01~VL10)

```
1 1 1 1 1 0 0 1 1 0 0 1 1 0 0
1 1 1 1 1 0 0 0 1 1 0 0 1 1 0 0
1 1 1 1 1 0 0 0 1 0 0 1 1 0 0 1
1 1 1 1 0 0 0 0 0 1 1 0 0 1 1
1 1 1 1 0 0 0 0 0 1 1 0 0 1 1
1 1 1 0 0 0 0 0 1 1 0 0 1 1 0
1 1 1 0 0 0 0 0 1 1 0 0 1 1 0
1 1 0 0 0 0 0 1 1 0 0 1 1 0 0
```
Horizontal-Up Masks: (HU01~HU10)

```
1 1 1 1 1 1 1 1 1 1 0 0 0 1 1
1 1 1 1 1 1 1 1 1 1 0 0 0 1 1 1
```

APPENDIX-continued

| | | | | | | | | | | | | | | | |
|---|---|---|---|---|---|---|---|---|---|---|---|---|---|---|---|
| 1 | 1 | 1 | 1 | 1 | 1 | 1 | 0 | 0 | 0 | 0 | 1 | 1 | 1 | 0 | 0 |
| 1 | 1 | 1 | 1 | 1 | 0 | 0 | 0 | 0 | 0 | 1 | 1 | 1 | 0 | 0 | 0 |
| 1 | 1 | 1 | 0 | 0 | 0 | 0 | 0 | 1 | 1 | 1 | 0 | 0 | 0 | 1 | 1 |
| 1 | 0 | 0 | 0 | 0 | 0 | 0 | 0 | 1 | 1 | 0 | 0 | 0 | 1 | 1 | 1 |
| 0 | 0 | 0 | 0 | 0 | 0 | 0 | 0 | 0 | 0 | 0 | 1 | 1 | 1 | 0 | 0 |
| 0 | 0 | 0 | 0 | 0 | 0 | 0 | 0 | 0 | 0 | 1 | 1 | 1 | 0 | 0 | 0 |

Horizontal-Down Masks: (HD01~HD10)

| | | | | | | | | | | | | | | | |
|---|---|---|---|---|---|---|---|---|---|---|---|---|---|---|---|
| 1 | 1 | 1 | 1 | 1 | 1 | 1 | 1 | 1 | 1 | 0 | 0 | 0 | 1 | 1 | 1 |
| 1 | 1 | 1 | 1 | 1 | 1 | 1 | 1 | 1 | 1 | 1 | 0 | 0 | 0 | 1 | 1 |
| 0 | 1 | 1 | 1 | 1 | 1 | 1 | 1 | 0 | 0 | 1 | 1 | 1 | 0 | 0 | 0 |
| 0 | 0 | 0 | 1 | 1 | 1 | 1 | 1 | 0 | 0 | 0 | 1 | 1 | 1 | 0 | 0 |
| 0 | 0 | 0 | 0 | 0 | 1 | 1 | 1 | 1 | 0 | 0 | 0 | 1 | 1 | 1 | 0 |
| 0 | 0 | 0 | 0 | 0 | 0 | 0 | 1 | 1 | 1 | 1 | 0 | 0 | 0 | 1 | 1 |
| 0 | 0 | 0 | 0 | 0 | 0 | 0 | 0 | 0 | 1 | 1 | 1 | 0 | 0 | 0 | 0 |
| 0 | 0 | 0 | 0 | 0 | 0 | 0 | 0 | 0 | 0 | 1 | 1 | 1 | 0 | 0 | 0 |

Some of other possible mask patterns: (O01~O06)

| | | | | | | | | | | | | | | | |
|---|---|---|---|---|---|---|---|---|---|---|---|---|---|---|---|
| 1 | 1 | 1 | 1 | 0 | 0 | 0 | 0 | 1 | 1 | 1 | 1 | 0 | 0 | 0 | 0 |
| 1 | 1 | 1 | 1 | 0 | 0 | 0 | 0 | 1 | 1 | 1 | 1 | 0 | 0 | 0 | 0 |
| 1 | 1 | 1 | 1 | 0 | 0 | 0 | 0 | 0 | 0 | 0 | 0 | 1 | 1 | 1 | 1 |
| 1 | 1 | 1 | 1 | 0 | 0 | 0 | 0 | 0 | 0 | 0 | 0 | 1 | 1 | 1 | 1 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 1 | 1 | 1 | 1 | 0 | 0 | 0 | 0 | 1 | 1 | 1 | 1 |
| 0 | 0 | 0 | 0 | 1 | 1 | 1 | 1 | 0 | 0 | 0 | 0 | 1 | 1 | 1 | 1 |
| 1 | 1 | 1 | 1 | 0 | 0 | 0 | 0 | 1 | 1 | 1 | 1 | 0 | 0 | 0 | 0 |
| 0 | 0 | 0 | 0 | 1 | 1 | 1 | 1 | 0 | 0 | 0 | 0 | 1 | 1 | 1 | 1 |
| 0 | 0 | 0 | 0 | 1 | 1 | 1 | 1 | 1 | 1 | 1 | 1 | 0 | 0 | 0 | 0 |
| 1 | 1 | 1 | 1 | 0 | 0 | 0 | 0 | 0 | 0 | 0 | 0 | 1 | 1 | 1 | 1 |
| 1 | 1 | 1 | 1 | 0 | 0 | 0 | 1 | 1 | 1 | 1 | 0 | 0 | 0 | 0 | 0 |
| 0 | 0 | 0 | 0 | 1 | 1 | 1 | 0 | 0 | 0 | 0 | 1 | 1 | 1 | 1 | 1 |
| 1 | 1 | 1 | 1 | 0 | 0 | 0 | 0 | 0 | 0 | 0 | 1 | 1 | 1 | 1 | 1 |
| 1 | 1 | 0 | 0 | 1 | 1 | 0 | 0 | 1 | 0 | 0 | 1 | 1 | 0 | 0 | 1 |
| 1 | 1 | 0 | 0 | 1 | 1 | 0 | 0 | 1 | 0 | 0 | 1 | 1 | 0 | 0 | 1 |
| 1 | 1 | 0 | 0 | 1 | 1 | 0 | 0 | 1 | 0 | 0 | 1 | 1 | 0 | 0 | 1 |
| 1 | 1 | 0 | 0 | 1 | 1 | 0 | 0 | 1 | 0 | 0 | 1 | 1 | 0 | 0 | 1 |
| 0 | 0 | 1 | 1 | 0 | 0 | 1 | 1 | 0 | 1 | 1 | 0 | 0 | 1 | 1 | 0 |
| 0 | 0 | 1 | 1 | 0 | 0 | 1 | 1 | 0 | 1 | 1 | 0 | 0 | 1 | 1 | 0 |
| 0 | 0 | 1 | 1 | 0 | 0 | 1 | 1 | 0 | 1 | 1 | 0 | 0 | 1 | 1 | 0 |
| 0 | 0 | 1 | 1 | 0 | 0 | 1 | 1 | 0 | 1 | 1 | 0 | 0 | 1 | 1 | 0 |
| 1 | 0 | 1 | 0 | 1 | 0 | 1 | 0 | 0 | 0 | 1 | 1 | 0 | 0 | 0 | 0 |
| 1 | 0 | 1 | 0 | 1 | 0 | 1 | 0 | 0 | 0 | 1 | 1 | 0 | 0 | 0 | 0 |
| 1 | 0 | 1 | 0 | 1 | 0 | 1 | 0 | 0 | 0 | 1 | 1 | 1 | 1 | 0 | 0 |
| 1 | 0 | 1 | 0 | 1 | 0 | 1 | 0 | 1 | 1 | 1 | 1 | 1 | 1 | 1 | 1 |
| 0 | 1 | 0 | 1 | 0 | 1 | 0 | 1 | 1 | 1 | 1 | 1 | 1 | 1 | 1 | 1 |
| 0 | 1 | 0 | 1 | 0 | 1 | 0 | 1 | 0 | 0 | 1 | 1 | 1 | 1 | 0 | 0 |
| 0 | 1 | 0 | 1 | 0 | 1 | 0 | 1 | 0 | 0 | 0 | 1 | 1 | 0 | 0 | 0 |
| 0 | 1 | 0 | 1 | 0 | 1 | 0 | 1 | 0 | 0 | 0 | 1 | 1 | 0 | 0 | 0 |

The invention claimed is:

1. A method for encoding an image block of an image using a texture-pattern-adaptive partitioned block transform, wherein said image block comprises N times M pixels with N being equal to or larger than M, said method comprising the steps of:
   a) partitioning the image block according to a current texture-pattern-adaptive partition associated with a current texture-pattern into a first sub-set of pixels and at least a second sub-set of pixels;
   b) using a texture-pattern associated scan order for arranging the pixels of the first sub-set in a meta-sequence of pixel sequences, said texture-pattern associated scan order being associated with the current texture-pattern and each of the pixel sequences comprising at most N pixels;
   c) generating a further meta-sequence of at most M further pixel sequences wherein each of the further pixel sequences comprises either one of the pixel sequences or a concatenation of pixel sequences of a sub-sequence of the meta-sequence with each of the further pixel sequences comprising at most N pixels;
   d) generating coefficient sequences by transforming the further pixel sequences;
   e) generating further coefficient sequences by one-dimensional transformations across the coefficient sequences;
   f) generating a yet further coefficient sequence by quantizing and scanning the coefficients comprised in the further coefficient sequences wherein scanning is done according to an encoding scan order;
   g) entropy encoding the yet further coefficient sequence; and
   h) entropy encoding an indication associated with the current texture-pattern.

2. The method of claim 1, wherein the current texture-pattern-adaptive partition is associated with one of the following texture patterns:
   a texture-pattern comprising multiple strips;
   an unsymmetrical texture-pattern; and
   a non-directional textured pattern.

3. The method of claim 1, further comprising applying steps b), c), d), e), f) and g) to the pixels of the at least a second sub-set.

4. The method of claim 3, wherein a different further encoding scan order is used in step f) for the at least a second subset.

5. The method of claim 3, further comprising coefficient prediction between the first sub-set and the at least a second sub-set.

6. A device for encoding an image block of an image using a texture-pattern-adaptive partitioned block transform, wherein said image block comprises N times M pixels with N being equal to or larger than M, said device comprising:
   means for partitioning the image block according to a current texture-pattern-adaptive partition associated with a current texture-pattern into a first sub-set of pixels and at least a second sub-set of pixels;
   means for using a texture-pattern associated scan order for arranging the pixels of the first sub-set in a meta-sequence of pixel sequences, said texture-pattern associated scan order being associated with the current texture-pattern and each of the pixel sequences comprising at most N pixels;
   means for generating a further meta-sequence of at most M further pixel sequences wherein each of the further pixel sequences comprises either one of the pixel sequences or a concatenation of pixel sequences of a sub-sequence of the meta-sequence with each of the further pixel sequences comprising at most N pixels;
   means for generating coefficient sequences by transforming the further pixel sequences;
   means for generating further coefficient sequences by one-dimensional transformations across the coefficient sequences;
   means for generating a yet further coefficient sequence by quantizing and scanning the coefficients comprised in the further coefficient sequences wherein scanning is done according to an encoding scan order;
   means for entropy encoding the yet further coefficient sequence; and
   means for entropy encoding an indication associated with the current texture-pattern.

7. A method for decoding a bit stream representative of an encoded image block of an image, said image block being encoded using a texture-pattern-adaptive partitioned block transform and comprises N times M pixels with N being equal to or larger than M, said method comprising the steps of:
   a) entropy decoding a first coefficient sequence comprised in the bit stream;
   b) entropy decoding an indication associated with a current texture-pattern said indication being comprised in the bit stream and determining an inverse texture-pattern-adapted scan order associated with the current texture-pattern;
   c) dequantizing the coefficients of the first coefficient sequence;
   d) using an inverse encoding scan order for arranging the dequantized first coefficients in two or more further first coefficient sequences;
   e) generating yet further first coefficient sequences by inverse one-dimensional transformations across the further first coefficient sequences;
   f) generating pixel sequences by inverse transformation of the yet further first coefficient sequences; and
   g) using the determined inverse texture-pattern adapted scan order for distributing the pixels of the pixel sequences over the image block.

8. The method of claim 7 further comprising entropy decoding a second coefficient sequence comprised in the bit stream and applying steps c), d), e), f) and g) to the second coefficient sequence.

9. A device for decoding a bit stream representative of an encoded image block of an image, said image block being encoded using a texture-pattern-adaptive partitioned block transform and comprises N times M pixels with N being equal to or larger than M, said device comprising:
   means for entropy decoding a coefficient sequence comprised in the bit stream;
   means for entropy decoding an indication associated with a current texture-pattern said indication being comprised in the bit stream and determining an inverse texture-pattern-adapted scan order associated with the current texture-pattern;
   means for dequantizing the coefficients of the first coefficient sequence;
   means for using an inverse encoding scan order for arranging the dequantized first coefficients in two or more further coefficient sequences;
   means for generating yet further first coefficient sequences by inverse one-dimensional transformations across the further first coefficient sequences;
   means for generating pixel sequences by inverse transformation of the yet further first coefficient sequences; and
   means for using the determined inverse texture-pattern adapted scan order for distributing the pixels of the pixel sequences over the image block.

* * * * *